Patented July 23, 1946

2,404,728

UNITED STATES PATENT OFFICE 2,404,728

METHOD OF PREPARING POLYMERIC SOLUTIONS

Theron G. Finzel, Cleveland, Ohio, assignor to E. I. du Pont de Nemours & Company, Wilmington, Del., a corporation of Delaware No Drawing. Continuation of application Serial No. 491,943, June 23, 1943. This application May 11, 1945, Serial No. 593,319

7 Claims. (Cl. 260—32)

This invention relates to the preparation of solutions of polymeric materials, and more particularly to the dissolving of polymers of acrylonitrile to form clear and substantially colorless solutions thereof.

This application is a continuation of my copending application Serial No. 491,943, filed June 23, 1943.

Copending application of Ray Clyde Houtz, Serial No. 447,446, filed June 17, 1942, and copending application of George Henry Latham, Serial No. 447,466, filed June 17, 1942, describe procedures for dissolving acrylonitrile polymers in volatile organic solvents to form solutions which are capable of being extruded through suitable apparatus to form shaped articles, such as films, filaments and the like. Organic solvent solutions of acrylonitrile polymers prepared as described in said copending applications show no tendency for the polymers to separate out from solution at ordinary or low temperatures, for example room temperature (75° F.) or lower, but it is difficult to initially prepare such solutions at ordinary temperatures of the order of 80° F. or less by merely stirring the polymer with the solvent because of the tendency of the polymer particles to become swollen and covered with a viscous coating which hinders the dissolving action of the solvent, the polymer particles tending to aggregate or "ball." This "balling" tendency can be overcome with dissolving of the polymer by stirring the mixture of polymer and solvent vigorously for extended periods of time at elevated temperatures, but the resulting solutions are highly colored and are therefore not completely satisfactory for the production of shaped articles, such as filaments and films. The initial appearance of color can be somewhat retarded by stirring the polymer and solvent in an oxygen-free atmosphere, but even with the use of this expedient, an undesirable amount of color develops before the polymer is completely dissolved.

Application of Ray Clyde Houtz, Serial No. 491,945, filed June 23, 1943, describes procedures preventing this undesirable "balling" of the polymer particles. This is obtained according to the said Houtz application by temporarily modifying the solvent to such an extent that it is no longer capable of dissolving or even substantially swelling the polymer, and stirring this modified solvent with the polymer particles (which particles have been ground to a particle size not larger than 20 mesh, and preferably much smaller) to form a slurry. As pointed out in said Houtz application, such a modification of the solvent is preferably obtained by cooling it to a low temperature, for example 0° C., although it can also be obtained by adding to the solvent a miscible liquid that is a non-solvent for the polymer, the liquid preferably being low-boiling so that it will later be removed from the solvent by heating. Suitable liquids include gasoline, dimethyl ether and acetone. Subsequent rapid heating of the slurry of polymer particles and modified solvent removes the modifying agent and results in the smooth, rapid formation of a desirable, substantially colorless solution of the polymer.

Such a process operates to yield a solution that is eminently suited for use in the manufacture of shaped articles that are free from objectionable color. However, the preferred method of operating the process, involving the step of cooling the solvent, requires the use of large, relatively extensive cooling equipment, while the other proposed method involves the use of considerable amounts of relatively expensive chemicals, whose recovery adds further to the cost of operation.

It is an object of this invention to provide an improved method for forming substantially colorless (water white or very light amber) solutions of polymeric materials which can be dissolved only with difficulty and the solutions of which are sensitive to heat and become colored upon prolonged exposure to elevated temperatures. A specific object of the invention is a method for forming a substantially colorless solution of an acrylonitrile polymer dissolved in a suitable organic volatile solvent. Other and additional objects will become apparent from the description hereinafter set forth.

The objects of the invention are accomplished, in general, by mixing a substantially colorless polymer, which normally develops color or prolonged exposure at elevated temperatures, i. e. 100° C. to 150° C. and higher, in a finely divided state in a solvent having a gaseous acidic anhydride dissolved therein. The polymer-modified solvent mixture is rapidly stirred and converted into a uniform slurry with substantially no tendency of the polymer to ball. The slurry is then heated at a temperature of 100° to 150° C. for a period of time to permit evolution of the gaseous acidic anhydride from the solvent and the solvent to exercise its strong dissolving effect on the polymer and convert it to a homogeneous, substantially colorless solution.

By the term "gaseous acidic anhydride" as used throughout the specification and claims is meant all acidic anhydrides that exist as gases at 20° C. and atmospheric pressure, such as, for example, carbon dioxide, sulfur dioxide, the various oxides of nitrogen and the like.

By the term "volatile organic solvent" as used throughout the specification and claims is meant an organic solvent which can be removed substantially completely by evaporation from a solution prepared therewith.

The following examples, in which parts proportions and percentages are by weight unless otherwise specified, illustrate methods for the treatment of acrylonitrile polymers to form useful solutions in accordance with this invention:

Example I

Sulfur dioxide gas bubbled into flasks, each of which contained approximately 41 parts of dimethyl formamide, at room temperature, to form solutions containing 3.5%, 7.8% and 19% sulfur dioxide. 9 parts of finely divided acrylonitrile polymer having a molecular weight of 130,000 and previously ground to a particle size of approximately 200 mesh were then added to each of the flasks at room temperature, and the mixtures rapidly stirred until an opaque, uniform suspension of the polymer particles in the liquid was formed. The suspension formed from the solution containing 3.5% sulfur dioxide became rather viscous after standing for 2 hours at room temperature. However, at the end of 20 hours at room temperature, it could still be stirred and showed no tendency to separate or form into difficultly soluble balls or lumps. A portion of the slurry was heated at 100° C. on a water bath. A slow stream of $SO_2$ was given off and the slurry showed signs of forming a solution at the end of 30 minutes. The slurry was completely converted to a substantially colorless solution at the end of 3 hours. Continued heating of this solution for a total of 16 hours did not cause it to color or darken appreciably. Another portion of the initial slurry was heated in an oil bath at a temperature of 120° C. to 130° C. The slurry formed into a substantially colorless solution at the end of 15 minutes of heating. Continued heating at this temperature resulted in only a slight increase in color of the solution.

The suspension formed from the solution containing 7.8% sulfur dioxide flowed freely after standing for 3 hours at room temperature. It became somewhat more viscous but could still be poured after standing for a period of 20 hours. When heated on a water bath at a temperature of 100° C., the slurry formed slowly into a substantially colorless solution. This solution was formed much more rapidly by heating at 115° C. Continued heating of the solution for a total of 16 hours at 100° C. caused only a slight increase in the color of the solution.

The suspension formed from the solution containing 19% sulfur dioxide flowed freely at the end of 20 hours. When heated for 15 to 20 minutes in an oil bath at 120° C. to 130° C., $SO_2$ was evolved and a substantially colorless solution of the polymer was obtained.

In contrast to the above procedure, 9 parts of the same finely divided acrylonitrile polymer were added with stirring to 41 parts of dimethyl formamide containing no sulfur dioxide. The mixture was allowed to stand at room temperature and within 10 minutes formed into a translucent, golden mass that contained visible balls or lumps. When heated on a water bath at 100° C. or in an oil bath at a temperature of 120° C. to 130° C., the balls dissolved slowly, a clear solution being obtained at the end of 3 hours. The solution, however, was reddish orange to brown in color. Continued heating of the solution at 100° C. resulted in further appreciable discoloration. Yarns spun from this solution possessed an undesirable dark color. On the other hand, yarns spun from the solutions prepared with the use of $SO_2$ were substantially colorless.

Example II 10 parts of solid carbon dioxide (dry ice) were stirred with 9 parts of the finely divided acrylonitrile polymer of Example I. After a few minutes, during which time the air was eliminated from the mass of polymer particles, approximately 40 parts of dimethyl formamide were added to the mixture of polymer particles and solid $CO_2$, the $CO_2$ particles dissolving rapidly in the dimethyl formamide and the polymer particles being suspended in the resulting solution in the form of a uniform slurry. The viscosity of the slurry increased slightly on standing at room temperature for 2 hours. When heated on a water bath at 100° C., there was a gradual evolution of $CO_2$ and the slurry formed within a period of approximately 1 hour to a clear, substantially colorless solution. Continued heating of this solution at this temperature for a total of 16 hours caused only a very slight increase in its color. Yarns spun from this solution were substantially colorless.

Example III

Sulfur dioxide gas was passed into tetramethylene cyclic sulfone at room temperature to form a 27% solution. 60 parts of this solution were mixed at room temperature with 8 parts of the finely divided acrylonitrile polymer of Example I, and the mixture rapidly stirred. An opaque, uniform suspension of the polymer was obtained, the suspension showing no tendency to separate out or gel and become viscous on standing at room temperature. When heated to a temperature 130° C., $SO_2$ gas was slowly evolved, and a clear, substantially colorless solution of the polymer was obtained at the end of 2 hours.

The acrylonitrile polymer treated in accordance with this invention is preferably prepared by the ammonium persulfate catalyzed polymerization of monomeric acrylonitrile dissolved or emulsified in water. It can, however, be prepared by any other suitable type of polymerization reaction, such as, for example, the emulsion-type reaction disclosed by United States Patent No. 2,160,054 to Bauer et al. The polymer preferably possesses a molecular weight within the range of 25,000 to 750,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} =$ specific viscosity $= \dfrac{\text{viscosity of solution}}{\text{viscosity of solvent}} - 1$ and $C =$ concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. When the monomer is present in 5% aqueous solution maintained at a temperature of from 3° C. to 5° C., it is found that the use of 4% of ammonium persulfate catalyst (based on the weight of the acrylonitrile) results in the formation of a polymer having a molecular weight (as calculated by the above equation) of approximately 60,000. Increasing or decreasing the amount of the catalyst, while maintaining the other conditions constant, decreases or increases the molecular weight of the polymer.

Although the invention is particularly concerned with the treatment of simple polymers of acrylonitrile, it is to be understood that the invention can be utilized to produce satisfactory solutions of other polymers of acrylonitrile which can be dissolved only in a limited number of solvents and at a temperature of 100° C. and above. Such polymers tend to develop color when subjected to prolonged heating in solution. Examples of such polymers other than the simple acrylonitrile polymers are copolymers or interpolymers of acrylonitrile containing at least 85% by weight of combined acrylonitrile. Thus, the invention contemplates within its scope the treatment of acrylonitrile polymer which has been interpolymerized with polymerizable substances, such as vinyl acetate, vinyl chloride, acrylic acid, its esters and homologues, styrene, isobutylene and other polymerizable substances; copolymers produced by the copolymerization of acrylonitrile monomer with such other polymerizable substances are also included.

The method of this invention comprises the steps of forming a slurry or a suspension of a finely divided polymer in a solvent in the presence of a gaseous acidic anhydride, and heating the slurry or suspension to form a clear, substantially colorless solution of the polymer. In general, the method of this invention is applicable to the preparation of solutions of any given polymeric substance in a suitable solvent. However, it is especially suited for use with those polymers that tend to darken when their solutions are maintained at elevated temperatures for prolonged periods of time. Typical polymers of this nature include polymers prepared wholly or in part from monomeric vinyl or acrylic compounds other than acrylonitrile.

Any of the volatile organic solvents utilized in the said copending applications of Houtz and Latham may be used, and these solvents include dimethyl formamide, dimethyl methoxy-acetamide, N-formyl morpholine, N-formyl hexamethylene imine, butadiene cyclic sulfone, tetramethylene cyclic sulfone, p-phenylene diamine, and the m- and p-nitrophenols, which have particularly marked dissolving power for the polymer at elevated temperatures.

The gaseous acidic anhydrides greatly reduce and modify the swelling and dissolving power of the solvent on the polymer so that it is possible to form at room temperature a stable slurry or dispersion of the polymer in the solvent. They are only gradually evolved from the solvent by heating to a temperature of 100° C. or higher, whereby the swelling and dissolving power of the solvent is only gradually restored and the polymer particles are dissolved without danger of "balling." The gaseous acidic anhydrides of the invention are relatively more dense than air and thus form, on evolution from the slurry, a blanket that prevents air from contacting the slurry and resulting solution. Moreover, the gaseous acidic anhydrides of this invention do not have any deleterious effect on the polymer.

It is not definitely known whether the gaseous acidic anhydrides react in whole or part with the solvent or the polymer to form some complex or other compounds or dissolve or become entrapped in the solvent or become adsorbed by the polymer. The terms "in the presence of," "containing," "incorporated," "dissolved" and the like, used in this specification and in the claims hereof, are intended to cover whatever takes place upon the modification of the dissolving characteristics of the solvent by the gaseous anhydrides.

As indicated by the examples, it is preferred to use such gaseous acidic anhydrides as carbon dioxide and sulfur dioxide. However, other such materials, including the oxides of nitrogen, can also be used. These acidic anhydrides are preferably dissolved in the solvent prior to the addition of the polymer and formation of the slurry. However, they can, if desired, be added to the solvent at the same time as the polymer particles. The anhydride can be added in the form of a gas or in a liquid or solid state; for example, carbon dioxide is much more easily handled as a solid rather than as a gas.

The acidic anhydride must, of course, be present in the solvent to a sufficiently great extent to render the solvent substantially incapable of swelling or dissolving the acrylonitrile polymer particles. The ease of formation and stability of the slurry vary directly with the concentration of the acidic anhydride and, while it is preferred that the material be present in the solvent to the extent of at least 3% of the total weight of solvent and acidic anhydride, satisfactory results can be obtained with concentrations as low as 1%, particularly when the slurry is to be formed at room temperature or below. This is because of the increased tendency of the unmodified solvent to swell the polymer particles and cause them to ball or lump together at elevated temperatures. Of course, higher concentrations of the acidic anhydride up to and including saturation of the solvent can also be used.

The polymer particles for use in the method of this invention are preferably ground to a size of about 100 to 200 mesh or even smaller. Particles of such size can be very readily dispersed in the modified solvent to yield a desirable slurry or suspension. This is not extremely critical to the invention, however, and satisfactory results can also be obtained when larger particles, the size of which does not exceed 20 mesh, are used. However, when the particle size exceeds 20 mesh, some difficulty is often experienced in obtaining the desired slurry.

The temperature and duration of heating required to remove the acidic anhydrides from the slurry and cause the formation of a clear solution of the polymer vary somewhat with the composition of the solvent and the nature and concentration of the acidic anhydride employed; for example, somewhat more strenuous heating is generally required in the case of solvent modified with sulfur dioxide rather than with carbon dioxide. Similarly, the higher the concentration of dissolved acidic anhydride, the more strenuous must be the heating conditions. The exact conditions required for any given combination of solvent and acidic anhydride can, of course, be readily determined by simple experiment.

The polymer solutions obtained by the practice of this invention are not only substantially colorless at the time of their formation, but are also capable of withstanding prolonged exposure to high temperatures without undergoing any further marked increase in color. This is evidently because the slow evolution of the gaseous acidic anhydrides of the invention from the slurry during the heating operation tend to sweep out any occluded or dissolved gases, such as oxygen, that might exert a deleterious effect on the polymer. Moreover, because the gaseous acidic anhydrides of the invention are relatively dense, they tend during the heating operation to form a protective blanket over the surface of the solution and protect it from contact with air or other harmful gases.

The solutions of this invention are eminently suited for use in the formation of shaped structures, such as yarns, films, etc. Structures prepared from these solutions are materially lighter in color than similar structures formed from solutions prepared without the use of an acidic anhydride.

The exact concentration of the solution to be used in the formation, by extrusion, of shaped articles will depend on the type of the shaped article to be formed and extrusion apparatus employed. Conventional apparatus generally requires that the solution contain from 15% to 30% polymer by weight, and the process of this invention is admirably suited for the preparation of such solutions in a colorless state. The process is not, however, limited to the preparation of solutions of such concentration. It can be used to advantage in the preparation of polymeric solutions of almost any given concentration.

In the claims, the term "slurry" is intended to also include a "suspension."

This invention provides a method for the preparation of clear, substantially colorless solutions of polymeric materials, such as polymers of acrylonitrile that tend to decompose upon exposure to elevated temperatures in solutions. The method is simple of operation and does not require the use of complicated apparatus or of expensive chemicals, whose recovery is essential to the economical operation of the process. The method is well adapted for use on a commercial scale.

Since it is obvious that many changes and modifications can be made in the above described details without departing from the nature and spirit of the invention, it is to be understood that the invention is not to be limited thereto except as set forth in the appended claims.

I claim:

1. The process of forming clear and substantially colorless solutions of acrylonitrile polymers which dissolve with difficulty and tend to develop color upon heating or prolonged standing, which comprises mixing such polymer in a finely divided state with a solvent for the polymer, said solvent containing incorporated therein as an agent to reduce the solubility of the polymer in said solvent a gaseous acidic anhydride, to form a slurry, and thereafter heating the slurry to a temperature sufficiently high to effect solution of the polymer while driving off the anhydride in the form of a gas, and maintaining such elevated temperature until a homogeneous and clear solution is formed.

2. The process of forming clear and substantially colorless solutions of acrylonitrile polymers which dissolve with difficulty and tend to develop color upon heating or prolonged standing, which comprises mixing such polymer in a finely divided state with a solvent for the polymer, said solvent containing incorporated therein as an agent to reduce the solubility of the polymer in said solvent carbon dioxide, to form a slurry, and thereafter heating the slurry to a temperature sufficiently high to effect solution of the polymer while driving off the carbon dioxide in the form of a gas, and maintaining such elevated temperature until a homogeneous and clear solution is formed.

3. The process of forming clear and substantially colorless solutions of acrylonitrile polymers which dissolve with difficulty and tend to develop color upon heating or prolonged standing, which comprises mixing such polymer in a finely divided state with a solvent for the polymer, said solvent containing incorporated therein as an agent to reduce the solubility of the polymer in said solvent sulfur dioxide, to form a slurry, and thereafter heating the slurry to a temperature sufficiently high to effect solution of the polymer while driving off the sulfur dioxide in the form of a gas, and maintaining such elevated temperature until a homogeneous and clear solution is formed.

4. The process of forming clear and substantially colorless solutions of acrylonitrile polymers which dissolve with difficulty and tend to develop color upon heating or prolonged standing, which comprises mixing such polymer in a finely divided state with dimethyl formamide having a gaseous acidic anhydride incorporated therein to form a slurry, and thereafter heating the slurry to a temperature sufficiently high to effect solution of the polymer while driving off the anhydride in the form of a gas, and maintaining such elevated temperature until a homogeneous and clear solution is formed.

5. The process of forming clear and substantially colorless solutions of acrylonitrile polymers which dissolve with difficulty and tend to develop color upon heating or prolonged standing, which comprises mixing such polymer in a finely divided state with dimethyl formamide containing carbon dioxide incorporated therein to form a slurry, and thereafter heating the slurry to a temperature sufficiently high to effect solution of the polymer while driving off the carbon dioxide in the form of a gas, and maintaining such elevated temperature until a homogeneous and clear solution is formed.

6. The process of forming clear and substantially colorless solutions of acrylonitrile polymers which dissolve with difficulty and tend to develop color upon heating or prolonged standing, which comprises mixing such polymer in a finely divided state with dimethyl formamide containing sulfur dioxide incorporated therein to form a slurry, and thereafter heating the slurry to a temperature sufficiently high to effect solution of the polymer while driving off the sulfur dioxide in the form of a gas, and maintaining such elevated temperature until a homogeneous and clear solution is formed.

7. The process of dissolving an acrylonitrile polymer containing at least 85% acrylonitrile in the polymer molecule which comprises mixing said polymer in a finely divided state with a solvent for the polymer in the presence of a gaseous acidic anhydride to form a slurry, and thereafter heating the slurry to a temperature of 100° to 150° C. until the polymer is dissolved with the formation of a homogeneous and clear solution, while driving off the anhydride in the form of a gas.

THERON G. FINZEL.

Certificate of Correction

Patent No. 2,404,728.

July 23, 1946.

THERON G. FINZEL

It is hereby certified that errors appear in the printed specification of the above numbered patent requiring correction as follows: Column 2, line 38, for "or" read *on*; column 3, line 15, before "bubbled" insert the word *was*; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*